United States Patent
Weiershausen

(10) Patent No.: US 8,085,137 B2
(45) Date of Patent: Dec. 27, 2011

(54) BRAKE DISK LOCK

(75) Inventor: Bernd Weiershausen, Rebe (DE)

(73) Assignee: ABUS August Bremicker Soehne KG, Wetter-Volmarstein (DE)

( * ) Notice: Subject to any disclaimer, the term of this patent is extended or adjusted under 35 U.S.C. 154(b) by 631 days.

(21) Appl. No.: 12/329,059

(22) Filed: Dec. 5, 2008

(65) Prior Publication Data

US 2009/0145705 A1  Jun. 11, 2009

(30) Foreign Application Priority Data

Dec. 5, 2007 (DE) .................... 10 2007 058 550

(51) Int. Cl.
*B60Q 1/00* (2006.01)
(52) U.S. Cl. .................. 340/425.5; 340/426.1; 340/427; 188/17; 188/265; 70/33; 70/228
(58) Field of Classification Search ............... 340/425.5, 340/426.1, 427, 10.1, 572.1; 188/17, 18 A, 188/18 R, 253, 265, 353, 1.11 R, 1.11 W, 188/1.11 L, 1.11 E; 70/33, 34, 225, 226, 70/233, 432, 434, 441, DIG. 49; 192/114 R, 192/114 T; 303/89
See application file for complete search history.

(56) References Cited

U.S. PATENT DOCUMENTS

| 5,507,160 | A | * | 4/1996 | Shieh | 70/233 |
| 5,530,427 | A | * | 6/1996 | Shieh | 340/542 |
| 5,736,924 | A | * | 4/1998 | Shieh | 340/426.14 |
| 5,823,025 | A | * | 10/1998 | Phifer | 70/226 |
| 5,964,107 | A | * | 10/1999 | Chang | 70/33 |
| 6,574,999 | B2 | * | 6/2003 | Chen | 70/33 |
| 7,467,530 | B2 | * | 12/2008 | Torrado et al. | 70/33 |

(Continued)

FOREIGN PATENT DOCUMENTS

DE   94 19 272 U1   3/1995

(Continued)

OTHER PUBLICATIONS

German Search Report dated Jun. 16, 2008 DE 10 2007 058 550.2.

*Primary Examiner* — George Bugg
*Assistant Examiner* — Sisay Yacob
(74) *Attorney, Agent, or Firm* — Gifford, Krass, Sprinkle, Anderson & Citkowski, P.C.

(57) ABSTRACT

The invention relates to a brake disk lock having a receiving gap for the receiving of a brake disk, comprising: a securing section for the closing of the receiving gap, an alarm device for the output of an alarm signal, a movable brake disk recognition device, a pressure switch having a contact element which is movable against the spring force of a first spring means by the brake disk recognition device to activate the alarm device, and an actuation section which is movable out of a release position into a securing position to close the receiving gap by means of the securing section. A second spring means is provided via which the actuation section is prestressed into the release position, with the switch body being coupled to the actuation section via the second spring means, and with the two spring means being matched to one another such that, on the movement of the actuation section into the securing position and on the presence of a brake disk in the receiving gap, the pressure switch is actuated against the spring force of the first spring means and a remaining relative movement between the brake disk recognition device and the actuation section is compensated by the second spring means.

25 Claims, 11 Drawing Sheets

U.S. PATENT DOCUMENTS

| | | | |
|---|---|---|---|
| 2003/0188938 A1* | 10/2003 | Li | 188/265 |
| 2004/0085222 A1* | 5/2004 | Yoshikawa | 340/825.69 |
| 2005/0103584 A1* | 5/2005 | Hogesta | 188/265 |
| 2007/0022791 A1* | 2/2007 | Torrado et al. | 70/33 |
| 2007/0022792 A1* | 2/2007 | Xavier et al. | 70/33 |
| 2008/0053766 A1* | 3/2008 | Costa | 188/344 |
| 2009/0173117 A1* | 7/2009 | Xavier et al. | 70/228 |

FOREIGN PATENT DOCUMENTS

DE  10 2005 043 927 A1  3/2007

* cited by examiner

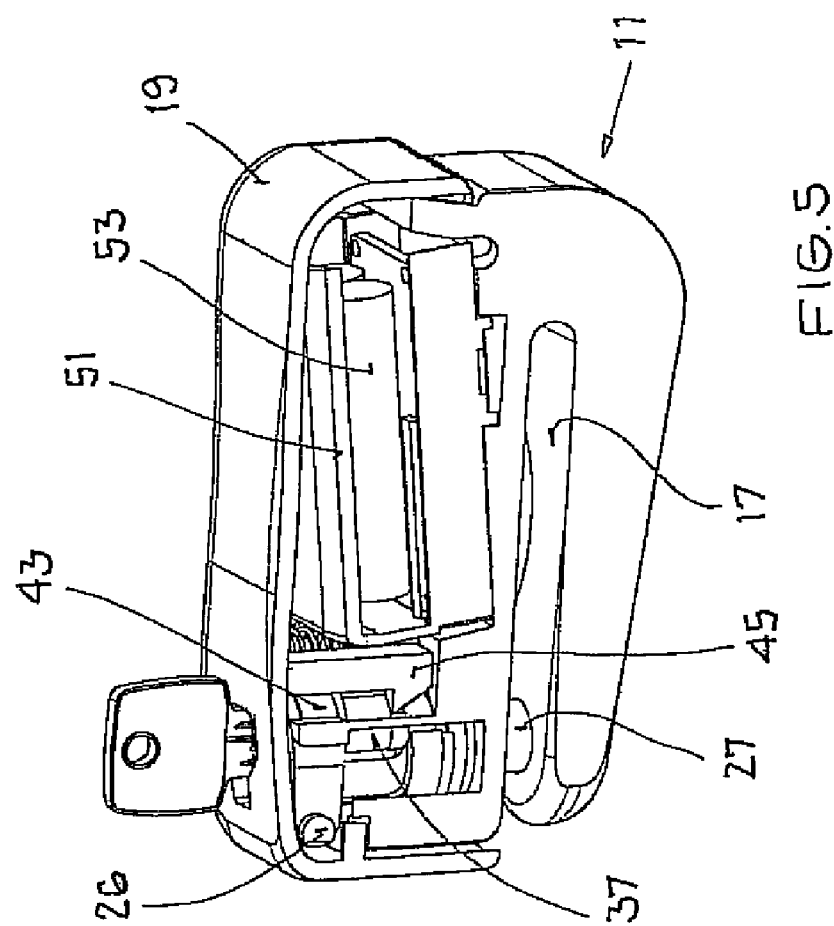
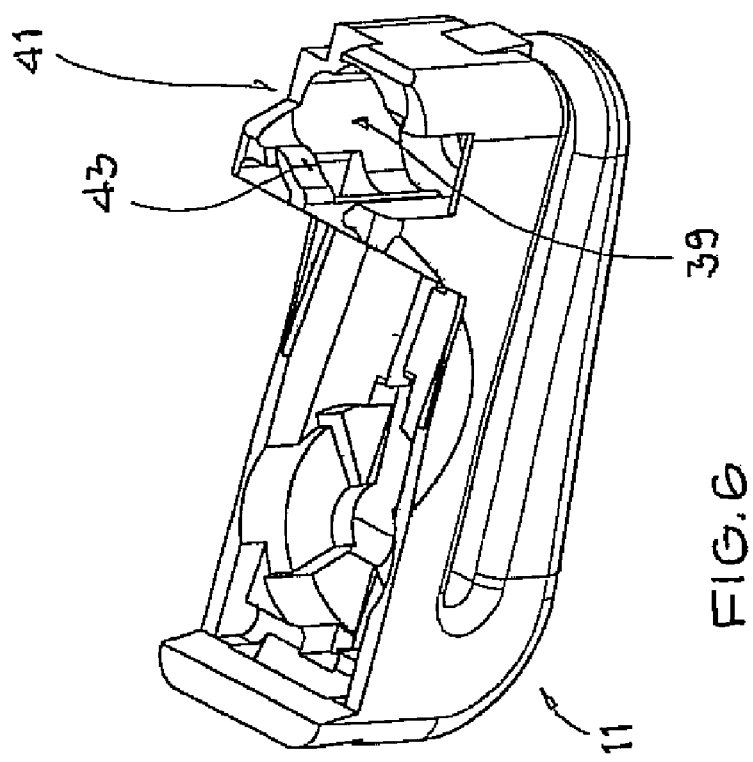

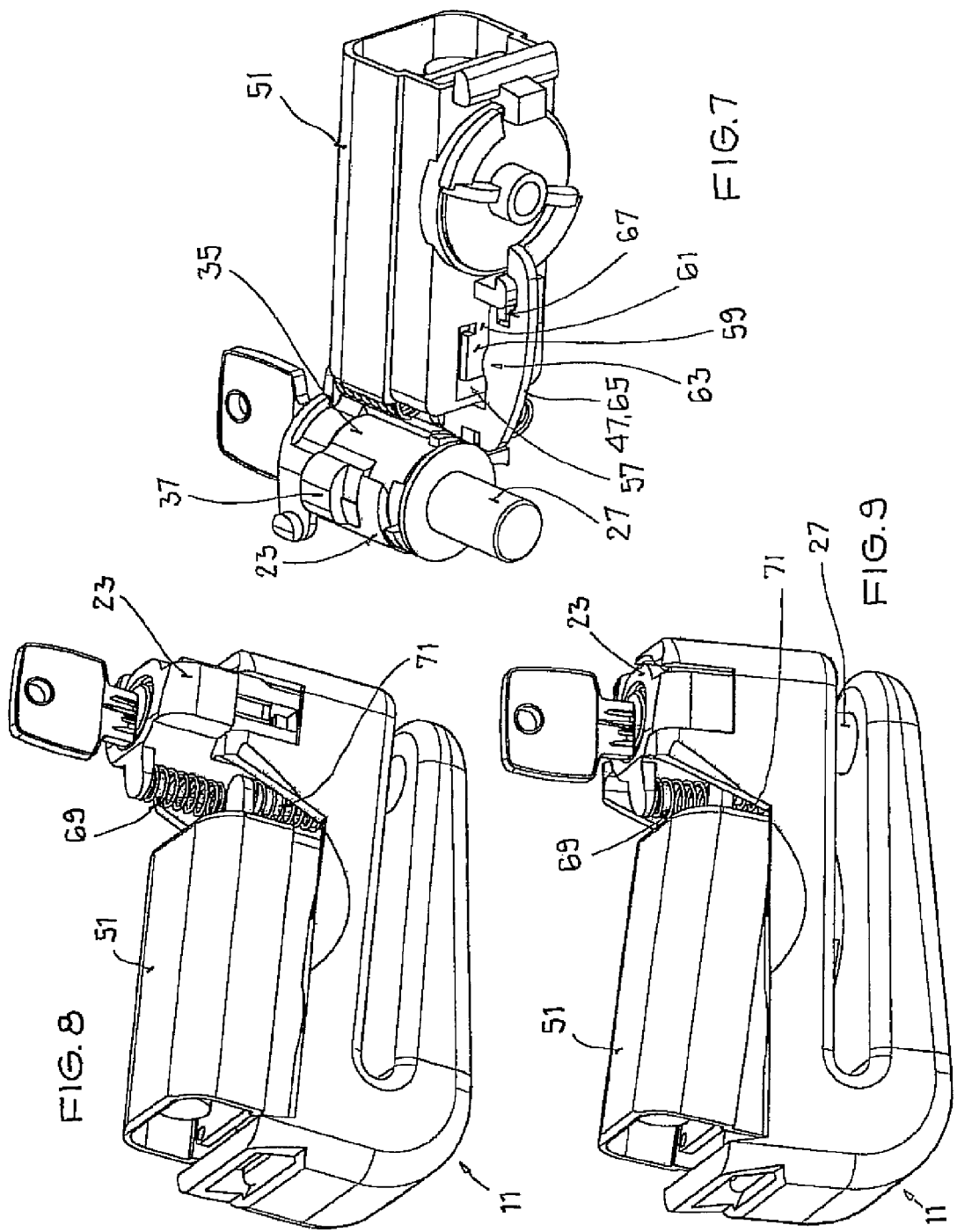

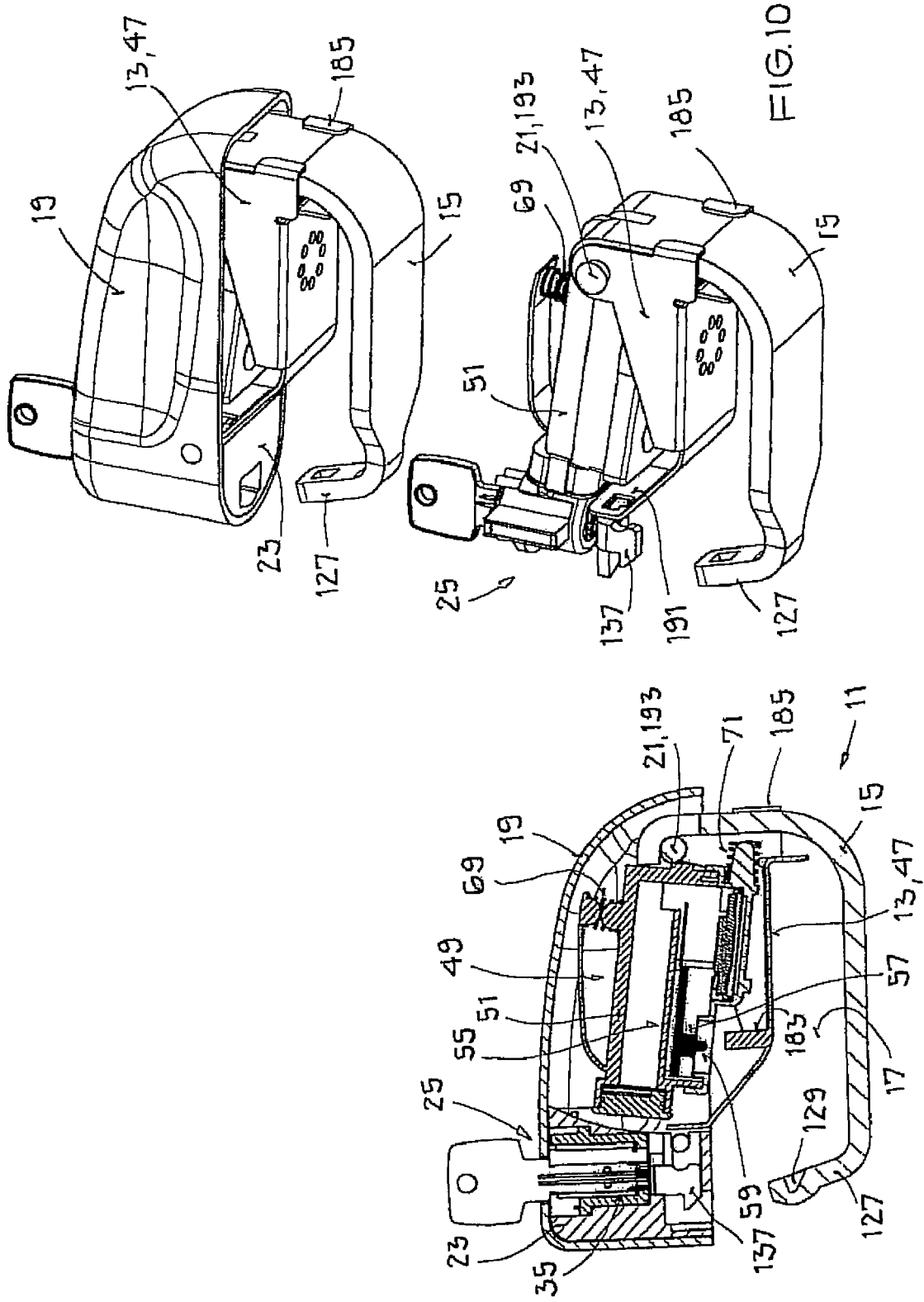

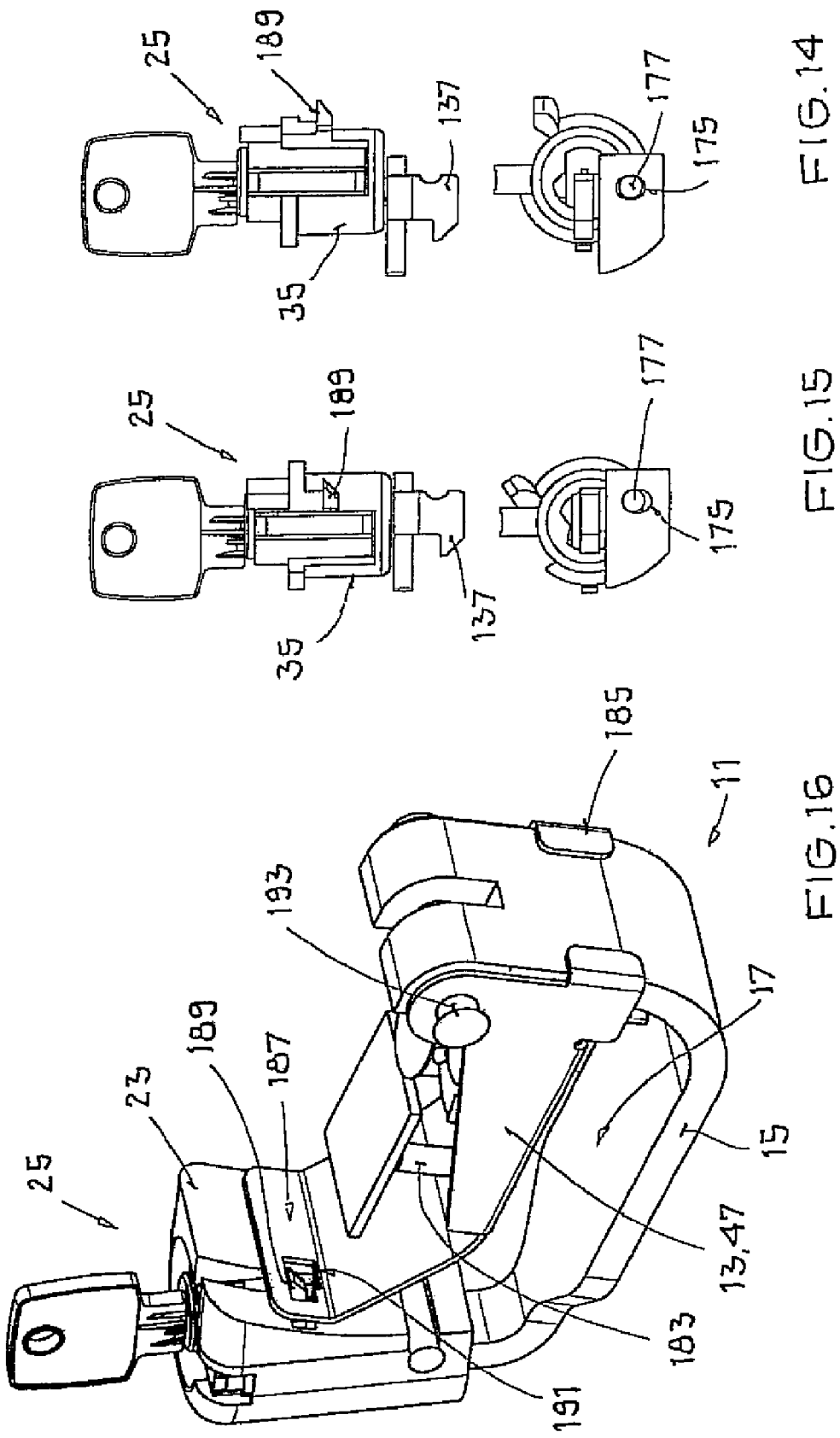

BRAKE DISK LOCK

CROSS-REFERENCE TO RELATED APPLICATIONS

This application claims priority of German Patent Application No. 10 2007 058 550.2 filed Dec. 5, 2007, which is incorporated herein by reference.

FIELD OF THE INVENTION

The present invention relates to a brake disk lock, having a receiving gap for the receiving of a brake disk, having a securing section for the closing of the receiving gap, having an alarm device for the output of an alarm signal, with the alarm device having a motion sensor, having a movable brake disk recognition device for the detection of whether a brake disk is located in the receiving gap, and having a switch to activate the alarm device.

BACKGROUND OF THE INVENTION

Such a brake disk lock serves for the securing of, for example, a motorcycle, a motor scooter or a quad bike against unauthorized use. For this purpose, the lock is placed onto a brake disk of the parked vehicle such that the brake disk projects into the receiving gap. The securing section is thereupon moved by actuation of the lock into a position in which the securing section traverses the receiving gap and is in this respect guided through an opening of the brake disk. The securing section is latched in this position. The lock is hereby closed at the brake disk and the use of the vehicle is prevented until the lock is again released from the brake disk.

A motion sensor is to be understood as a sensor which detects an acceleration, a vibration, a positional change or any other movement of the lock. If the motion sensor detects such a movement, the alarm device—provided it is activated—outputs an acoustic and/or a visual alarm signal. This alarm function serves, on the one hand, to remind the user of the vehicle as necessary before setting off that the lock is still located at the brake disk. On the other hand, the alarm device also satisfies a theft alarm function since break-open attempts are necessarily associated with a certain movement or vibration of the brake disk lock.

To activate and deactivate the alarm device automatically, a brake disk recognition device is provided which checks whether a brake disk is currently in the brake disk receiver, with the alarm device being activated if this is the case and with the alarm device otherwise being deactivated.

A brake disk lock of the initially named kind is shown in DE 10 2005 043 027 A1 in which an "AND" coupling is necessary for the activation of the alarm device. The alarm device is only activated when a brake disk is located in the brake disk receiver to bring a switch into a stand-by position via the brake disk recognition device and to actuate the switch if at the same time a latching mechanism is in a latching position.

The brake disk lock described in DE 10 2005 043 927 A1 is comparatively complex and/or expensive from a construction aspect since the switch is resiliently supported in a first direction and is actuated in a second direction perpendicular thereto.

SUMMARY OF THE INVENTION

It is the object of the invention to provide a brake disk lock of the initially named kind which has a simpler design.

This object is satisfied by a brake disk lock having the features of claim 1 and in particular by a brake disk lock having a receiving gap for the receiving of a brake disk, comprising a securing section for the closing of the receiving gap, an alarm device for the output of an alarm signal, with the alarm device having a motion sensor, a movable brake disk recognition device for detecting whether a brake disk is located in the receiving gap, a pressure switch having a contact element which is movable against the spring force of a first spring means by the brake disk recognition device and relative to a switch body of the pressure switch to activate the alarm device, and an actuation section which is movable from a release position into a securing position to close the receiving gap by means of the securing section. A second spring means is provided via which the actuation section is prestressed into the release position, with the switch body being at least indirectly coupled to the actuation section via the second spring means, and with the two spring means being matched to one another such that, on the movement of the actuation section into the securing position and on the presence of a brake disk in the receiving gap, the pressure switch is actuated against the spring force of the first spring means and a remaining relative movement between the brake disk recognition device and the actuation section is compensated by the second spring means.

At least two spring means are therefore provided. The first spring means is associated with the pressure switch which is provided for the actuation of the alarm device. If the actuation section is moved from the release position into the securing position to close the receiving gap by means of the securing section, the pressure switch is simultaneously actuated by means of the brake disk recognition device, provided that a brake disk is received in the receiving gap, i.e. the actuation section and at least the switch body of the pressure switch are each moved relative to the brake disk recognition device. The alarm signal is preferably not triggered immediately on a movement of the brake disk lock, despite an actuated pressure switch, to give the authorized user sufficient time to apply and remove the brake disk lock from the brake disk.

The second spring means is provided for the purpose of coupling the switch body of the pressure switch to the actuation section so that a movement of the actuation section also results in a movement of the switch body. If a brake disk which the brake disk recognition device can contact is present in the receiving gap, that part of a relative movement between the actuation section and the brake disk recognition device which is not taken up by the first spring means is taken up by the second spring means.

The two spring means are matched to one another in this respect such that a brake disk of sufficient thickness also reliably results in an actuation of the pressure switch, with a relative movement to be received going beyond the actuation of the pressure switch being at least substantially taken up by the second spring means. To ensure a reliable actuation of the pressure switch when the brake disk is introduced into the receiving gap, the spring constant of the first spring means can be smaller than the spring constant of the second spring means so that the length change of the first spring means is greater than that of the second spring means on a movement of the actuation section into the securing position. The pressure switch is thus already actuated at a time at which the length change of the second spring means is relatively small.

The second spring means allows brake disks of different thicknesses to be received in the receiving gap, whereby damage to the pressure switch, whose associated first spring means may only permit comparatively small thickness variations, can be avoided. Since the second spring means forms a resilient support for the switch body of the pressure switch, the pressure switch can also be actuated directly or at least indirectly by the brake disk recognition device without any damage to the pressure switch having to be feared, whereby a simple design of the brake disk lock can be ensured. In this respect, it is preferred if the first spring means and the second spring means act substantially in the same direction.

Furthermore, the actuation section is prestressed into the release position via the second spring means. This simplifies the removal of a brake disk lock attached to a brake disk since then the user of the brake disk lock does not actively have to take care that the securing section releases the receiving gap again, but this is rather automatically ensured by the prestress of the housing shell. The handling capability of the brake disk lock is hereby increased. The second spring means thus takes over a dual function, namely the prestressing of the housing shell into the release position as well as the taking up of the remaining relative movement explained above.

To protect the pressure switch against excessive strain and/or damage, the spring force exerted by the first spring means in the securing position is preferably smaller than the spring force exerted by the second spring means on the presence of a brake disk in the receiving gap and with an actuated pressure switch. This can be achieved, for example, by an abutment for the brake disk recognition device to limit that part of the relative movement between the brake disk recognition device and the actuation section taken up by the first spring means.

The actuation section is preferably made as a housing shell. The closing of the receiving gap can be carried out with only one hand and thus particularly simply by the provision of the actuating means in the form of a housing shell. The housing shell is preferably made as a handle within which, in the release position and/or securing position, the pressure switch, the brake disk recognition device and/or a housing of the alarm device, in particular for at least one battery, is at least partly received.

In accordance with an embodiment of the invention, the actuation section and the pressure switch are arranged pivotably with respect to one another.

The pressure switch can be rigidly attached to a housing of the alarm device, in particular for at least one battery. The actuation section and the housing of the alarm device can in particular be arranged pivotably with respect to one another.

A lock body is preferably provided which has a support section and an engagement hoop which bound the receiving gap, with the actuation section being supported movably, in particular pivotably, with respect to the support section and/or with respect to the engagement hoop. The brake disk lock can be pressed toward a brake disk via the support section. The engagement hoop engages behind the brake disk so that the brake disk is received in the receiving gap formed by the support section and by the engagement hoop. When the brake disk lock is pressed onto the received brake disk, the actuation section in particular located on the same side as the support section with respect to the brake disk can be moved from the release position in the direction of the receiving gap, whereby a closing of the receiving gap by the securing section is achieved.

In accordance with another embodiment of the invention, a third spring means is provided via which the switch body is coupled to the lock body, in particular to the support section or to the engagement hoop. A floating support of the alarm device, of the pressure switch and/or of the brake disk recognition device can be achieved between the housing shell and the lock body by the second spring means and by the third spring means. Mechanical or thermal length changes of the components of the brake disk lock can thereby be taken up and tolerances can be compensated. Furthermore, two spring means can provide more spring excursion for the taking up of the relative movement between the brake disk recognition device and the actuation section than is the case with only one spring means. The third spring means can furthermore be provided to prestress or to press the actuation section together with the second spring means into the release position and/or to act such that the switch body and/or the brake disk recognition device are urged out of the receiving gap in the release position.

The second spring means and the third spring means can be substantially identical; they can at least have identical spring constants.

The support section can be identical with the brake disk recognition device. The number of the components required for the brake disk lock can hereby be reduced.

In accordance with another aspect of the invention, a latch is provided, with the securing section being latched by means of the latch (e.g. by an automatic function) or being latchable (e.g. by an actuation by a user) in the securing position. An automatic movement of the housing shell into the release position which may occur can be effectively suppressed by the latching of the securing section. The latch can, for example, be actuated via a lock cylinder of the lock, in particular via a catch device drive-operatively connected to the lock cylinder. The latch can be made separately from the catch device or in one piece with it.

In accordance with an embodiment of the invention, the brake disk recognition device and the pressure switch are arranged pivotably with respect to one another. The actuation section, the brake detection device and the pressure switch can in particular have a common pivot axis.

A locking mechanism can be provided, with the brake disk recognition device being held in the position actuating the pressure switch by means of the locking mechanism in the securing position. A locking element shaped at the catch or coupled to the catch in any other manner can, for example, be provided which engages into a locking receiver of the support section and/or of the brake disk recognition device. The locking mechanism is preferably made such that on a breaking open attempt, for example on an attack with a chisel or a wedge starting between the brake disk and the brake disk lock, the locking mechanism is plastically deformed, in particular such that a rotation of the catch is also no longer possible after the removal of the wedge force.

The contact element can be prestressed by means of the first spring means with respect to the switch body of the pressure switch. It is, however, also generally possible that the first spring means is relaxed with a non-actuated pressure switch.

In accordance with another embodiment of the invention, the brake disk recognition device is held in the release position with clearance to the contact element of the pressure switch.

On the movement of the actuation section into the securing position, the brake disk recognition device can be moved along.

In the release position, the brake disk recognition device can substantially be pivoted out of the receiving gap.

Further embodiments of the invention are described in the dependent claims.

BRIEF DESCRIPTION OF THE DRAWINGS

The invention will be described in the following with reference to two embodiments and to the drawing. In which are shown:

FIG. 5 the brake disk lock of FIG. 1, with a latch which is in a latching rest position, in a cross-sectional view;

FIG. 6 a lock body of the brake disk lock of FIG. 1, in a perspective view;

FIG. 7 the brake disk lock of FIG. 1, with a latch which is in its unlatching deflected position, with the housing shell and a lock body of the brake disk lock being omitted with respect to FIG. 1, in a perspective view;

FIG. 8 the brake disk lock of FIG. 1, with two compression springs, with the housing shell being omitted with respect to FIG. 1, in a perspective view;

FIG. 9 the brake disk lock of FIG. 1, with two compression springs, with the housing shell being omitted with respect to FIG. 1, in a perspective view;

FIG. 10 a brake disk lock in accordance with the invention in accordance with a second embodiment of the invention, with a housing shell and a pressure switch, with the housing shell being located in a release position and the pressure switch being unactuated, in different views;

FIG. 14 a lock cylinder, a catch and a latch of the brake disk lock of FIG. 10, with the latch being located in a latching rest position, in different views;

FIG. 15 a lock cylinder, a catch and a latch of the brake disk lock of FIG. 10, with the latch being located in an unlatching deflected position, in different views; and FIG. 16 the brake disk lock of FIG. 10, with a locking mechanism, with parts of the brake disk lock being omitted with respect to FIG. 10.

DETAILED DESCRIPTION OF THE PREFERRED EMBODIMENTS

The brake disk lock shown in FIGS. 1 to 9 in accordance with a first embodiment of the invention has a lock body 11 with a substantially U-shaped structure. The one limb of this U shape forms a support section 13 with which the brake disk lock can be pressed toward a brake disk, not shown, of a motorcycle or the like, and the other U limb forms an engagement hoop 15. The support section 13 and the engagement hoop 15 extend substantially parallel to one another and they bound a receiving gap 17 for the receiving of the aforesaid brake disk. The support section 13 and the engagement hoop 15 are made in one piece in this respect.

Figure 1:
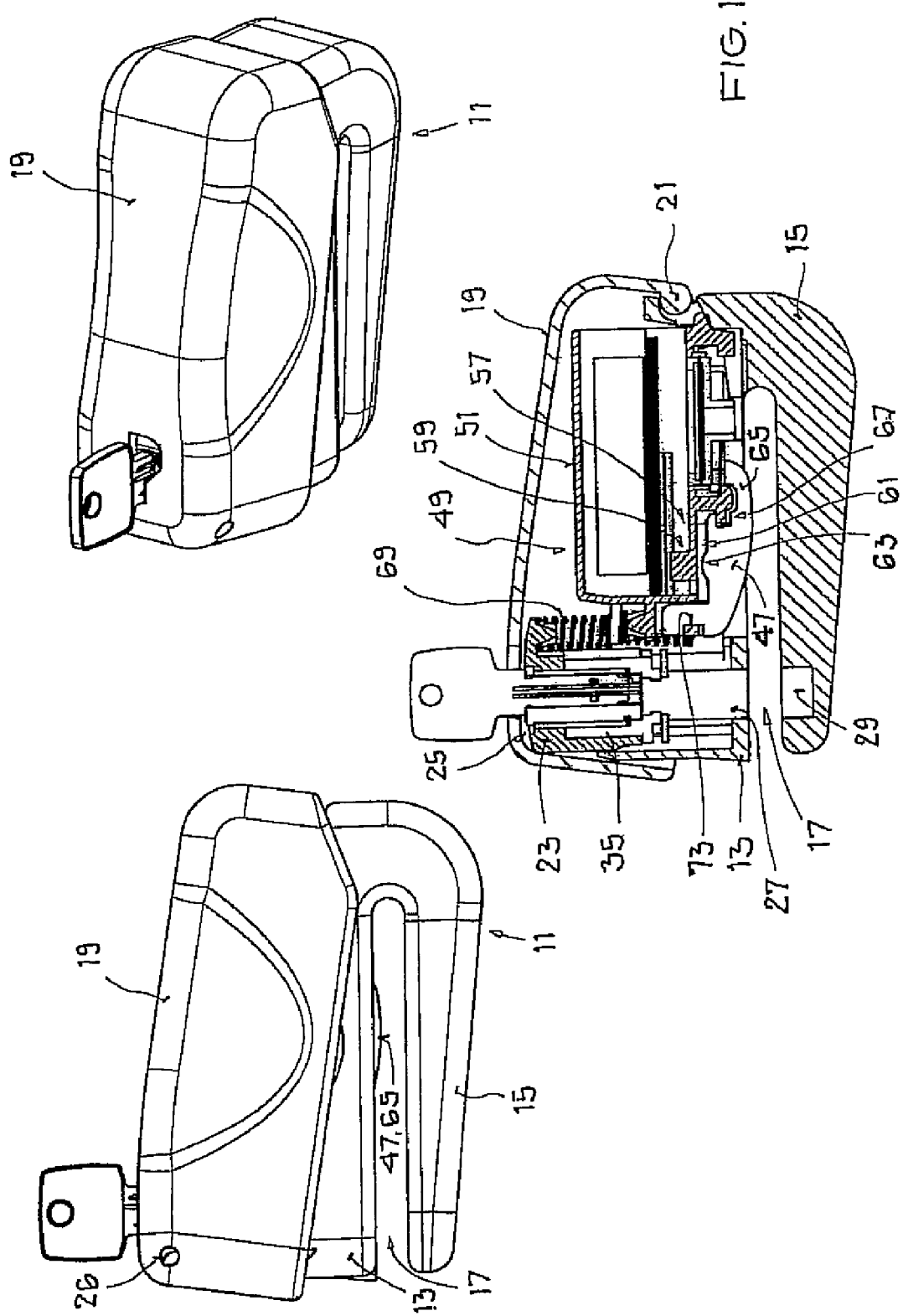
FIG. 1 a brake disk lock in accordance with the invention in accordance with a first embodiment of the invention, with a housing shell and a pressure switch, with the housing shell being located in a release position and the pressure switch being unactuated, in different views.
Figure 2:
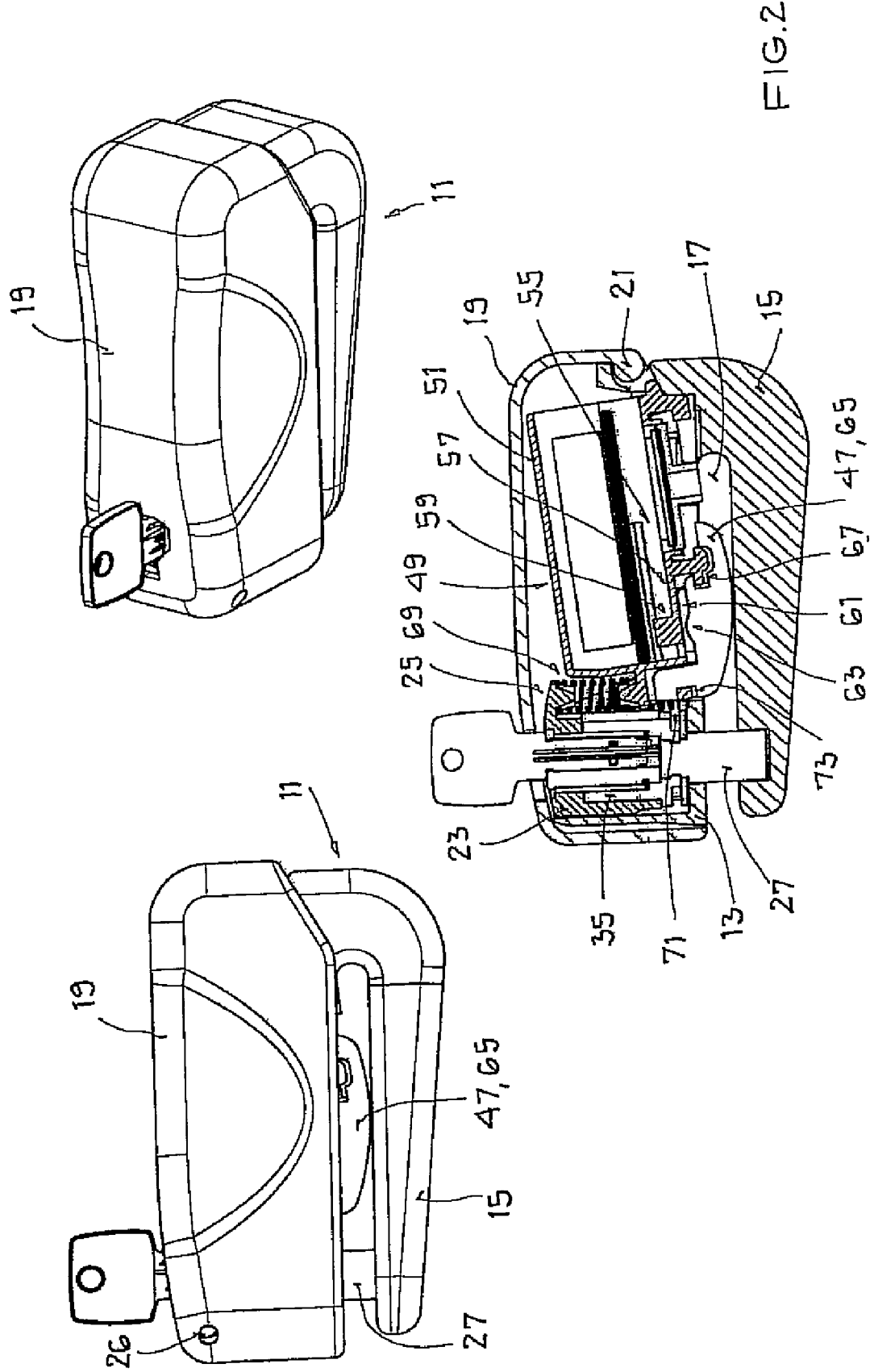
FIG. 2 the brake disk lock of FIG. 1, with the housing shell being located in a securing position and the pressure switch being unactuated, in different views.
Figure 3:
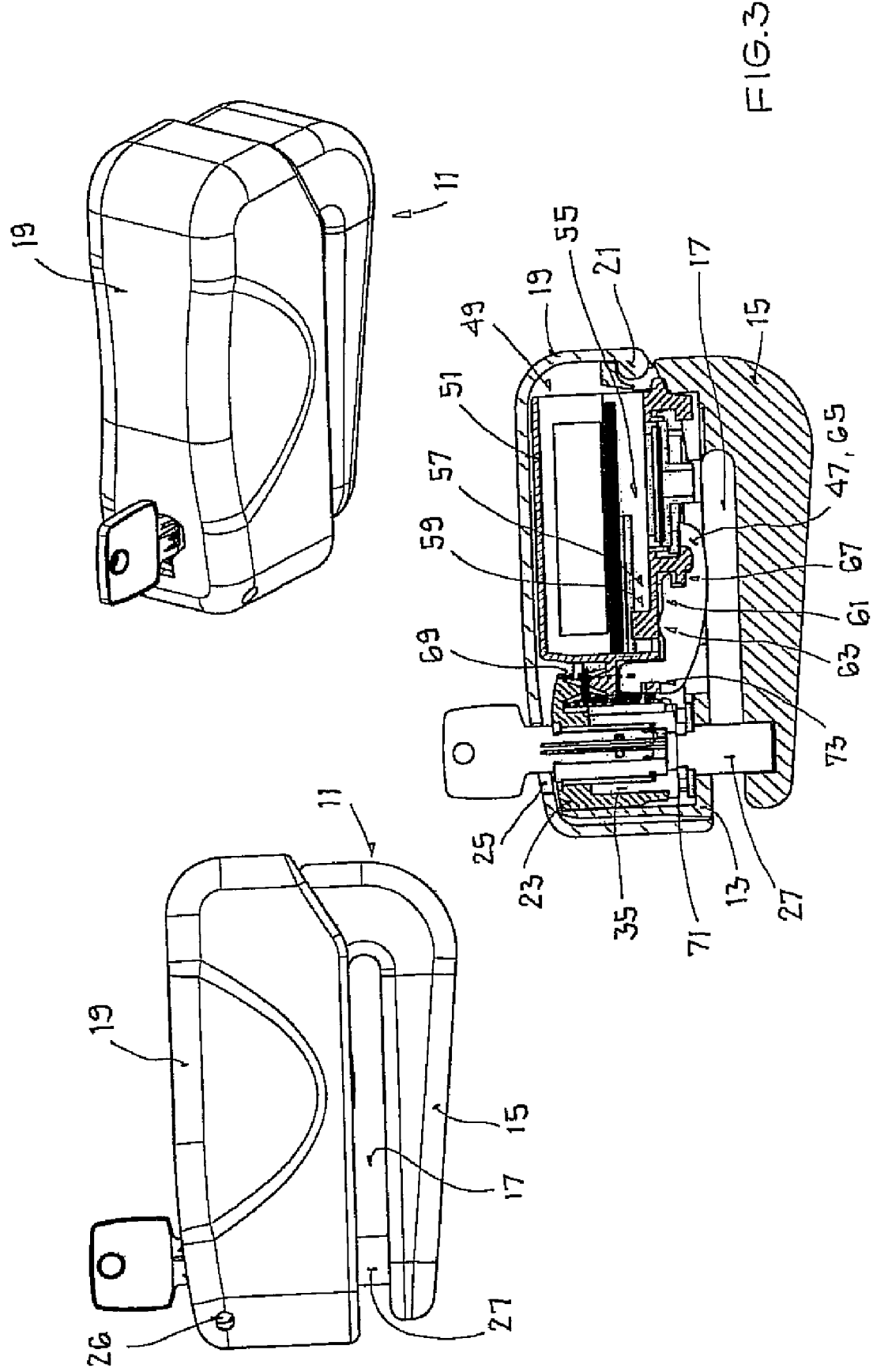
FIG. 3 the brake disk lock of FIG. 1, with the housing shell being located in a securing position and the pressure switch being actuated, in different views.

Furthermore, the brake disk lock includes an actuation section which is made as an actuable housing shell 19 which acts as a handle for a user of the brake disk lock. The housing shell 19 and the engagement hoop 15 are arranged on different sides with respect to the receiving gap 17. The housing shell 19, which is therefore located on the same side as the support section 13, is pivotably supported at the support section 13. The housing shell 19 can therefore be pivoted relative to the lock body 11 from a release position (FIG. 1) around a pivot axis 21 into a securing position (FIGS. 2, 3). The support section 13 is partly received in the housing shell 19 in the release position and is completely received in the housing shell in the securing position.

The free pivot end of the housing shell 19 surrounds an inner housing 23 in which a lock cylinder 25 is in turn received. The inner housing 23 is displaceably supported within the support section 13 is and pivotally connected to the housing shell 19 by means of a holding pin 26. The lock cylinder 25 is supported axially fixedly with respect to its axis of rotation within the inner housing 23. In the axial extension of the lock cylinder 25, a securing section of the lock is provided which is made as a striker pin 27 here. The striker pin 27 which projects out of the housing shell 19 and faces in the direction of the receiving gap 17 in the release position is provided to close the receiving gap 17, which is in open FIG. 1, in the securing position (FIGS. 2, 3). The striker pin 27 is connected to the housing shell 19 via the inner housing 23.

If the housing shell 19 is moved or pivoted relative to the support section 13 from the release position (FIG. 1) in the direction of the receiving gap 17 into the securing position (FIGS. 2, 3), the striker pin 27 is simultaneously also urged in the direction of the receiving gap 17 and is moved through it to close it in a closing position. In the closing position, the striker pin 27 engages into a cut-out 29 formed in the engagement hoop 15. A particular advantage of the lock shown thus consists of the fact that the receiving gap 17 is closed by means of the striker pin 27 solely by pressing the housing shell 19 toward the support section 13 being supported at the brake disk. Provided that additionally the automatic function which will be explained in the following is realized, the lock is simultaneously secured at the brake disk by the pressing movement of the housing shell. The handling of the lock is thus particularly simple.

Figure 4:
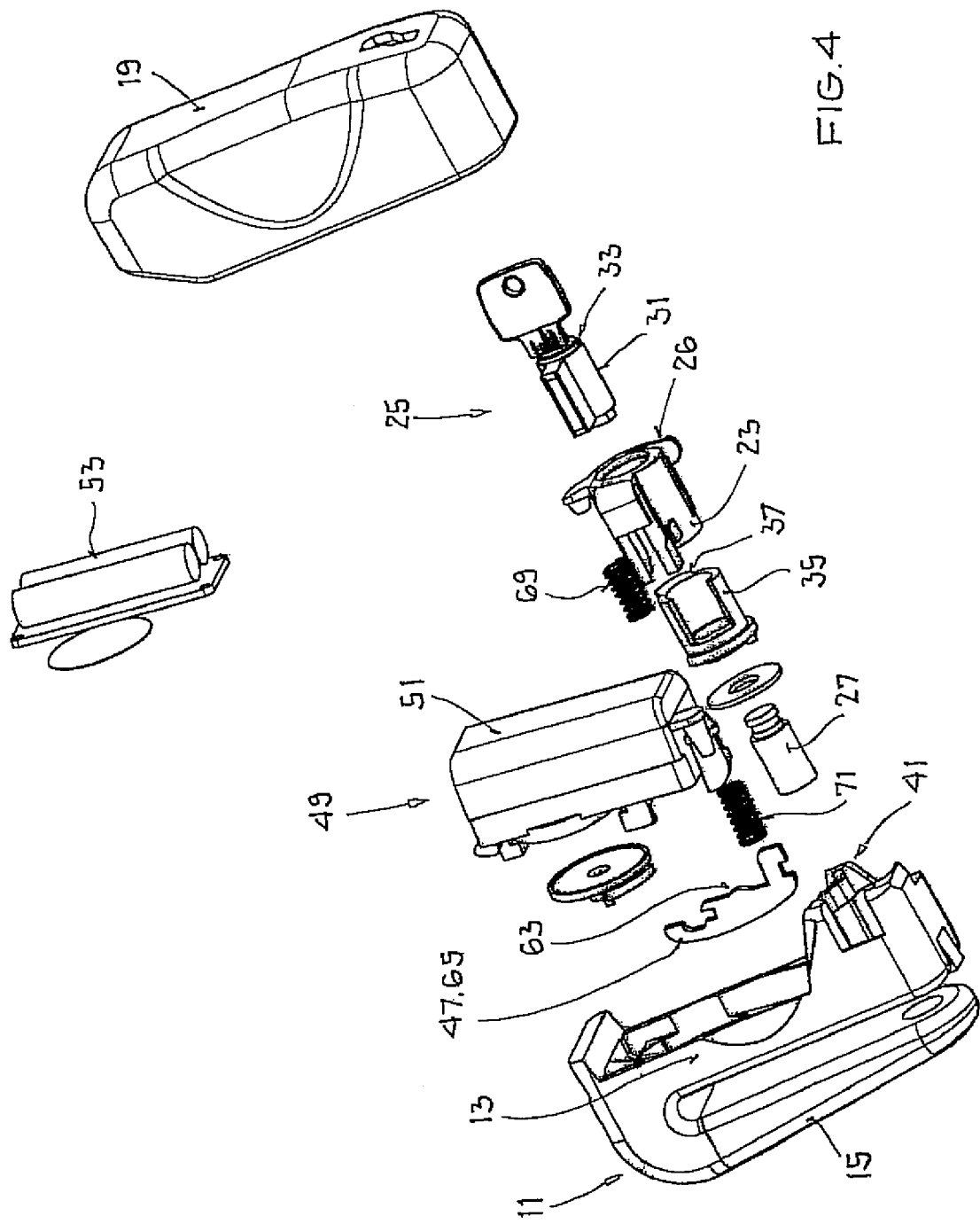
FIG. 4 the brake disk lock of FIG. 1, in an exploded view.
Figure 11:
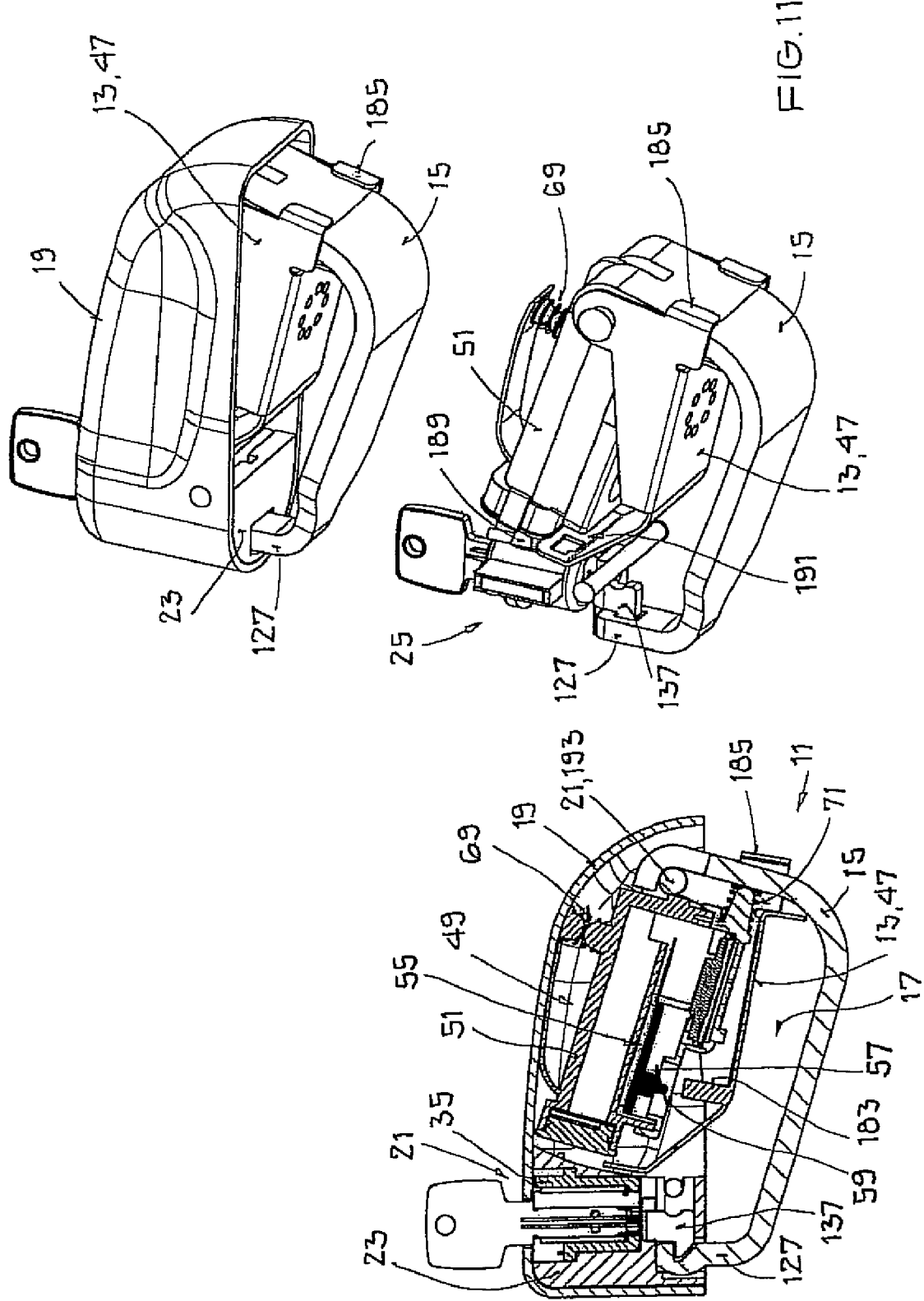
FIG. 11 the brake disk lock of FIG. 10, with the housing shell being located in a securing position and the pressure switch being unactuated, in different views.
Figure 12:
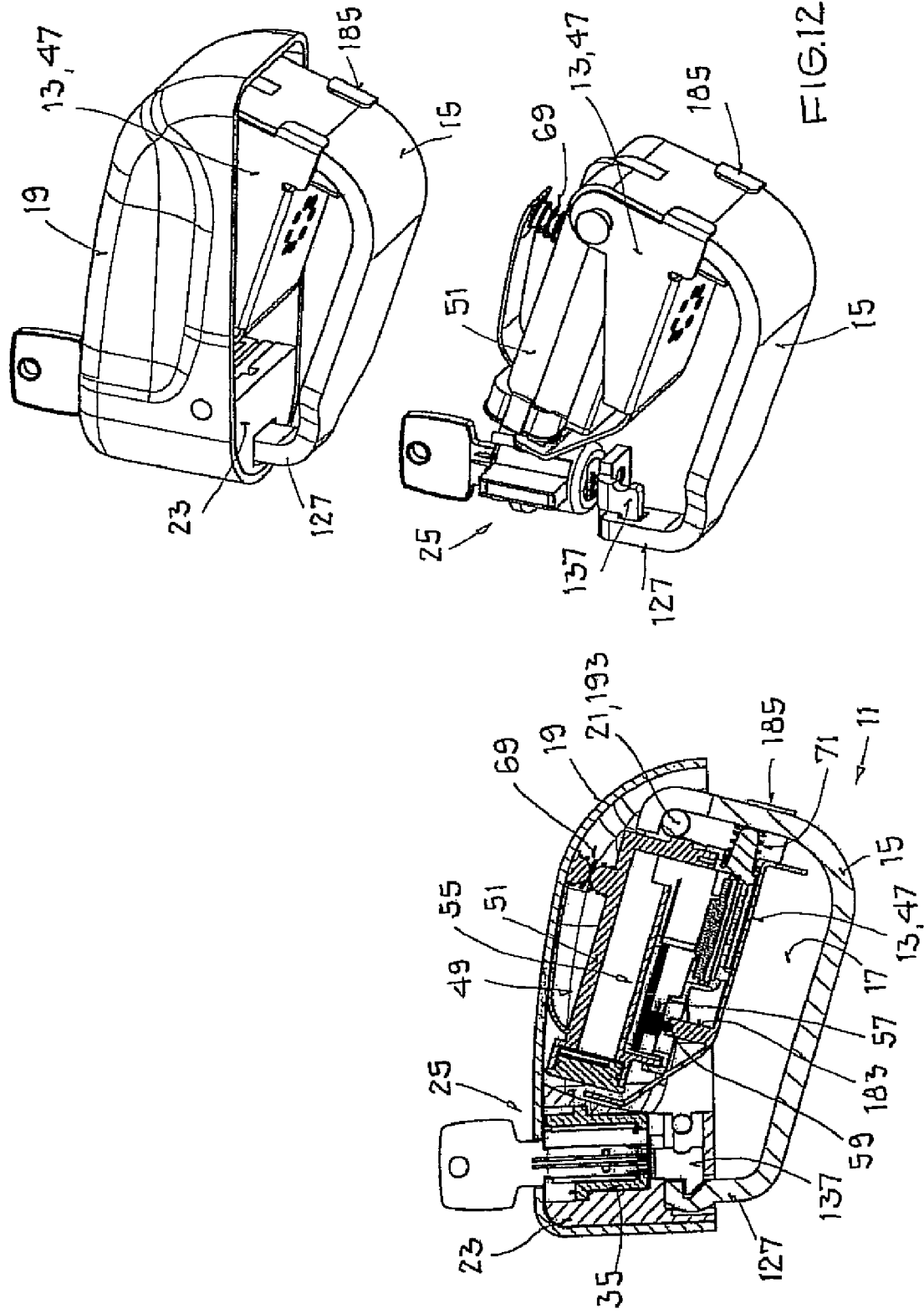
FIG. 12 the brake disk lock of FIG. 10, with the housing shell being located in a securing position and the pressure switch being unactuated, in different views.
Figure 13:
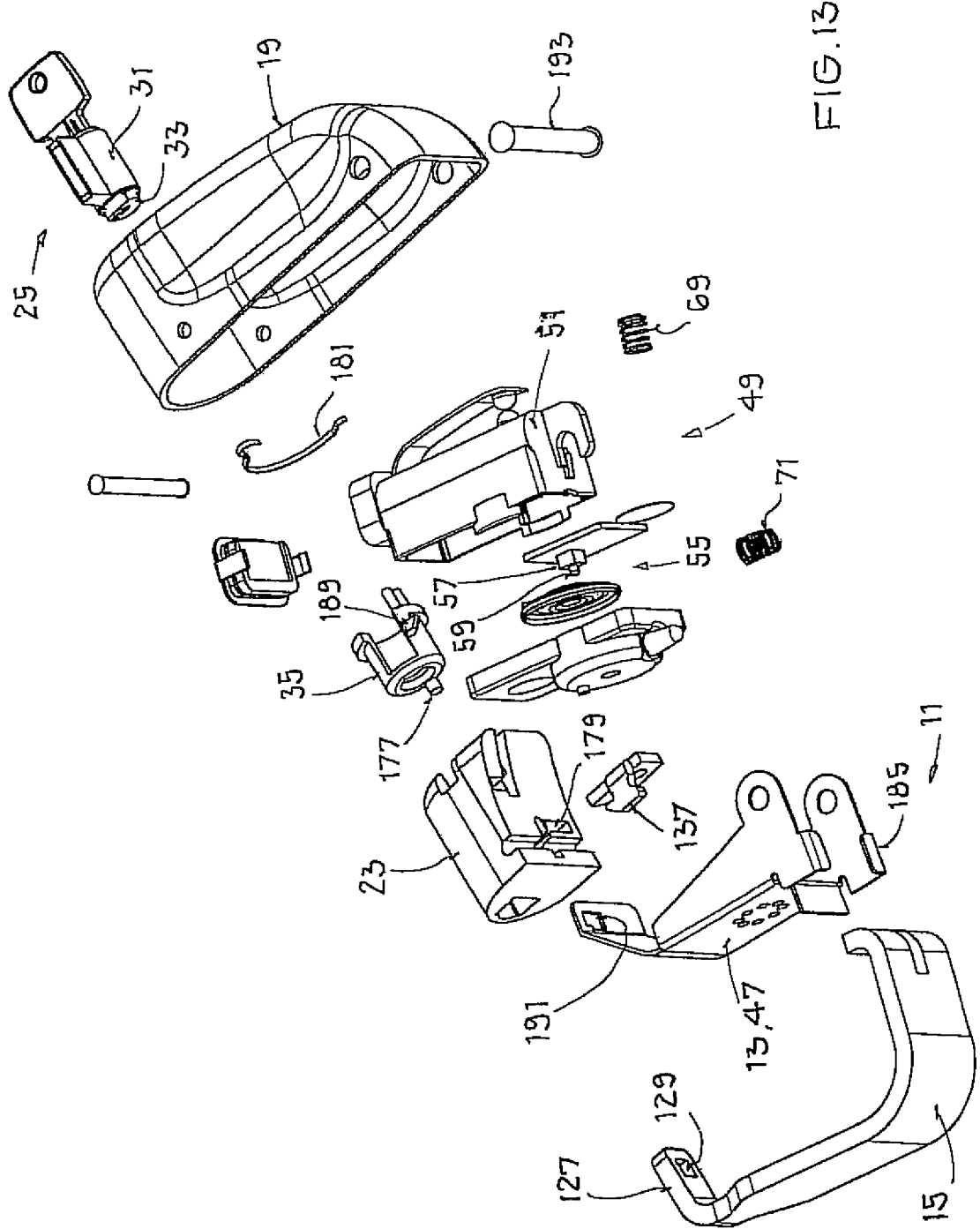
FIG. 13 the brake disk lock of FIG. 10, in an exploded view.

The lock cylinder 25 includes a cylinder housing 31 and a cylinder core 33 arranged rotationally movably within the cylinder housing 31 (FIG. 4). The cylinder housing 31 is fixedly connected to the inner housing 23. The cylinder core 33 is drive-operatively connected to a rotationally movable, axially fixedly supported catch 35 at which a latch 37 is shaped in one piece (FIG. 5). The catch 35 and the latch 37 are likewise received within the housing shell 19. The striker pin 27 first has a neck at its end facing the catch 35 and adjoining it a head projecting radially outwardly over the neck. The catch 35 is in turn made laterally open at its end facing the striker pin 27 (FIG. 7) and has at this end a partly peripheral inwardly projecting shoulder to hold the head of the striker pin 27 and thus the total striker pin 27 at the catch 35.

The catch 35 and thus the latch 37 are prestressed in a latching rest position (FIG. 5), whereby an automatic function is realized which is made possible by a coupling only rotationally fixed in one direction of rotation between a catch section of the cylinder core 33 and the catch 35. A bent rotary catch spring not shown here is provided for the realization of the prestress, such as will be described in the following in connection with a second embodiment of the invention. The named rest position can, however, only be adopted in the securing position of the housing shell 19. The catch 35, which is axially fixedly coupled to the housing shell 19, has compulsory guidance outside the securing position, namely in a groove 39 (FIG. 6) which is made in a receiver 41 of the support section 13 provided in the region of the free pivot end of the housing shell 19 for the inner housing 23, for the lock cylinder 25 and for the striker pin 27. This groove 39 prevents a rotary movement of the catch 35 as long as it has not been moved axially toward the lower end of the groove 39—that is in the direction of the receiving gap 17—by a corresponding actuation of The housing shell 19.

In the rest position, the latch 37 engages between an internally protruding projection 43 of the receiver 41 of the support section 13, on the one hand, and a hook-shaped holding arm 45, on the other hand, whose other end is fastened to an inner side of the housing shell 19 (FIG. 5). In the rest position of the latch 37, the striker pin 27 is thus latched, i.e. the striker pin 27 is secured against an axial movement from the aforesaid closing position since is contacts the axially latched catch 35 at the upper side. At the same time, the holding arm 45 prevents the housing shell 19 from moving back into the release position.

To move the latch 37 from its latching rest position into an unlatching deflected position (FIG. 7), the latch 37 is rotated against the prestress by a corresponding rotary actuation of the cylinder core 33 of the lock cylinder 25 by means of an associated key in the direction of the groove 39 which enables an axial movement of the catch 35 along the receiver 41 of the support section 13. The striker pin 27 contacting the lower side of the catch 35 can thus now move out of the receiving gap 27 and the housing shell 19 can now pivot back from the securing position into the release position.

A purely translatory movement of the housing shell 19 can naturally also be provided instead of the explained pivot movement.

The housing shell 19 surrounds a brake disk recognition device 47 of the brake disk lock in the securing position, provided that a brake disk is received in the receiving gap 17 in the securing position (FIG. 3). The brake disk recognition device 47 is provided to detect whether a brake disk is located in the receiving gap 17. Furthermore, the housing shell 19 surrounds an alarm device 49 for the output of an alarm signal both in the release position and in the securing position. The alarm device 49 includes a motion sensor, not shown, a control board, not drawn, an alarm output device, not shown, for example a loudspeaker, and a housing 51 for at least one battery 53 (FIG. 5), for the motion sensor and for the control board.

In addition, a pressure switch 55 is provided which is likewise received in the housing shell 19. The pressure switch 55 includes a switch body 57 which is rigidly fastened to the housing 51 of the alarm device 49 and a contact element 59 which is movable by the brake disk recognition device 47 against the spring force of a first spring means 61 and relative to the switch body 57 to activate the alarm device 49. The first spring means 61 is here made as a bending beam or alternatively, for example, as a compression spring included in the pressure switch 55, said bending beam or said compression spring acting between the switch body 57 and the contact element 59. A pressure switch is generally a switch which is actuated by pressing against a force, in particular against a mechanical spring tension, to establish an electrical contact.

The brake disk recognition device 47 is held at the switch body 57 via a pivot point 67 and it includes a switch plate 65 with an arched neck 63 which acts as a switch rocker. In the release position of the housing shell 19 (FIG. 1) and in the securing position of the housing shell 19, provided no brake disk is received in the receiving gap 17 in the securing position (FIG. 2), the brake disk recognition device 47 with the arched neck 63 of the switch plate 65 is arranged with clearance to the contact element 59 of the pressure switch 55 so that the pressure switch 55 is not actuated in FIGS. 1 and 2. The securing position in accordance with FIG. 2 is provided for the carrying along or transporting of the brake disk lock.

The housing 51 of the alarm device 49 and thus the pressure switch 55 fixedly attached thereto are pivotable both relative to the housing shell 19 and relative to the lock body 11 substantially around the pivot axis 21 of the housing shell 19.

The alarm device 49 and the pressure switch 55 are coupled to the housing shell 19 via a second spring means 69 (FIGS. 8, 9) which is made as a compression spring and has a larger spring constant than the first spring means 61. Furthermore, the alarm device 49 and the pressure switch 55 are coupled to the lock body 11 or its support section 13 via a third spring means 71 (FIGS. 8, 9) which is substantially identical to the second spring means 69. The first spring means 61 and the second spring means 69 act in substantially the same direction. A floating support of the alarm device 49, of the pressure switch 55 and of the brake disk recognition device 47 is achieved between the housing shell 19 and the lock body 11 by the second and third spring means 69, 71.

It is achieved by the second spring means 69 that, on the movement of the housing shell 19 into the securing position (FIGS. 2, 3), the alarm device 49, the pressure switch 55, and thus the brake disk recognition device 47, is moved along. A prestress of the housing shell 19 into the release position and relative to the support section 13 is achieved by the second spring means 69, in particular by the second spring means 69 and the third spring means 71. The alarm device 49, and thus the pressure switch 55, is urged out of the receiving gap 17 by the third spring means 69 so that, in the release position (FIG. 1), the brake disk recognition device 47 held at the switch body 57 is substantially pivoted out of the receiving gap 19. It is thus achieved by the cooperation of the second spring means 69 with the third spring means 71 that the brake disk recognition device 47 is only moved into the receiving gap 17 when the housing shell 19 is pressed in the direction of the support section 13 after a brake disk has been introduced into the receiving gap 17. The brake disk recognition device 47 can thus be made as a simple sheet metal part 65 and does not, for example, have to be made in ball shape, for instance, or with any other particular shape.

The first spring means 61 and the second spring means 69 are matched with respect to one another such that, on the movement of the housing shell 19 from the release position into the securing position, the pressure switch 55 or its contact element 59 is actuated against the spring force of the first spring means 61 in every case, provided that a brake disk is received in the receiving gap 17 (FIG. 3). In this respect, the housing shell 19 moves relative to the brake disk recognition device 47. The clearance present between the brake disk recognition device 47 and the pressure switch 55 in FIGS. 1 and 2 is eliminated in this respect. A remaining relative movement between the housing shell 19 and the brake disk recognition device 47 going beyond this is taken up by the second spring means 69. It is thus achieved by the cooperation of the first spring means 61 and of the second spring mans 69 that a reliable activation of the alarm device 49 is always ensured for brake disks of different thickness.

To avoid any damage to the first spring means 61, an abutment 73 is provided for the brake disk recognition device 47. The spring excursion of the first spring means 61, and thus that part of the relative movement between the housing shell 19 and the brake disk recognition device 47 which is taken up by the first spring means 61, is hereby limited. The spring force exerted by the first spring means 61 is therefore smaller than the spring force exerted by the second spring means 69 in the securing position, provided that a brake disk is received in the receiving gap 17 (FIG. 3).

The brake disk lock in accordance with a second embodiment of the invention shown in FIGS. 10 to 16 substantially corresponds to the brake disk lock in accordance with the first embodiment so that mutually corresponding parts of the two embodiments are provided with the same reference numerals. A repeated presentation of these parts, their function and cooperation with other parts will be omitted and reference is made in this respect to the above description on the brake disk lock in accordance with the first embodiment. Only the differences of the second embodiment with respect to the first embodiment will therefore be explained in the following.

The securing section, which is made as the striker pin 27 in the brake disk lock in accordance with the first embodiment, corresponds in the brake disk lock in accordance with the second embodiment to the bent over free end 127 of the engagement hoop 15. The free end 127 of the engagement hoop 15 has a cut-out 129 into which a latch 137 engages in the securing position of the housing shell 19 to latch the free end 127 of the rear latch hoop 15. The latch 137 is arranged within the housing shell 19 and in an axial extension of the lock cylinder 25.

The latch 137 is coupled via an elongate hole 175 (FIGS. 14, 15) to a catch pin 177 of the catch 35 and has compulsory guidance in a latch guide 179 formed in the inner housing 23 (FIG. 13) so that a rotary movement of the cylinder core 33 of the lock cylinder 25 is converted into a linear movement of the latch 137 perpendicular to the longitudinal axis of the lock cylinder 25, whereby the latch 137 is movable between the latching rest position (FIG. 14) and the unlatching deflected position (FIG. 15). The catch 35 and thus the latch 137 are prestressed via a rotary catch spring 181 (FIG. 13) into the latching rest position to ensure the automatic function.

Furthermore, the lock body 11 of the brake disk lock in accordance with the second embodiment is made in two pieces. The support section 13 and the engagement hoop 15 are supported pivotably with respect to one another, with the support section 13, the engagement hoop 15 and the housing shell 19 having a common pivot axis which is formed by a groove 193, with the groove 193 being pushed through corresponding bores in the housing shell 19 and in the support section 13 in the region of the base of the U-shaped lock body 11. It is made possible by the two-part design of the lock body 11 in the brake disk lock in accordance with the second embodiment that the pressure switch 55 is not actuated in the securing position of the housing shell 19, provided that no brake disk is received in the receiving gap 17 (FIG. 11), since the support section 13 in the brake disk lock in accordance with the second embodiment simultaneously also corresponds to the brake disk recognition device 47.

At its side remote from the receiving gap 17, an actuation pin 183 is shaped at the support section 13 or at the brake disk recognition device 47 or at a sealing surface, not shown, for the alarm device 19, by which actuation pin the pressure switch 55 is actuated when the housing shell 19 is pivoted out of the release position into the securing position, provided that a brake disk is received in the receiving gap 17.

The pressure switch 55 in accordance with the second embodiment is made as a push button in which the contact element 59 is prestressed with respect to the switch body 57 in the direction of a position not actuating the pressure switch 55 by means of an integrated compression spring, not shown, which corresponds to the first spring means, and thus to the bending beam 61 of the first embodiment. This compression spring (as the first spring means) cooperates with a compression spring 69 (as a second spring means) and is matched thereto, as explained in connection with the first embodiment.

Since the pressure switch 55 is rigidly fastened to the housing 51 of the alarm device, which is likewise pivotable around the rivet 193, the support section 13 and the brake disk recognition device 47 and the pressure switch 55 are also pivotable relative to one another. Finally, the housing shell 19, the housing 51, the alarm device 49, the pressure switch 55, the engagement hoop 15 and the support section 13 or the brake disk recognition device 47 are pivotable relative to one another around the common pivot axis 21.

The support section 13 has two catch claws 185 which engage around the section of the engagement hoop 15 directed in the direction of the rivet 193. It is hereby ensured on the movement of the housing shell 19 relative to the support section 13 from the release position into the securing position that the housing shell 19 is moved in a substantially corresponding manner relative to the engagement hoop 15 or vice versa. If the support section 13 is pressed toward the brake disk by pressing the brake disk lock in the direction of the brake disk, the engagement hoop 15 is taken along, whereby the receiving gap 17 is closed. The support section 13 or the brake disk recognition device 47 therefore actuates both the engagement hoop 15 and the pressure switch 55.

The third spring means 71 is—contrary to the case with the brake disk lock in accordance with the first embodiment—not supported at the support section 13, but rather at the engagement hoop 15 so that the housing shell 19 is prestressed in the direction of the release position relative to the engagement hoop 15.

Furthermore, a locking mechanism 187 (FIG. 16) is provided in the brake disk lock in accordance with the second embodiment to hold the actuation pin 138 of the brake disk recognition device 47 in the position actuating the pressure switch 55. For this purpose, a catch nose 189 is formed at the catch 35 and engages in the latching rest position of the latch 137 into a window 191 formed at the free end of the support section 13.

It must still be noted with respect to the two explained embodiments that a compulsory control of the catch 35 effective in both rotary directions by means of the lock cylinder 25 can also be provided instead of an automatic function.

The invention claimed is:

1. A brake disk lock having a receiving gap (17) for the receiving of a brake disk, comprising:
    a securing section (27, 127) for the closing of the receiving gap (17);
    an alarm device (49) for the output of an alarm signal, with the alarm device (49) having a motion sensor;
    a movable brake disk recognition device (47) for detecting whether a brake disk is located in the receiving gap (17);
    a pressure switch (55) having a contact element (59) which is movable by the brake disk recognition device (47) against the spring force of a first spring means (61) and relative to a switch body (57) of the pressure switch (55) to activate the alarm device (49); and
    an actuation section (19) which is movable out of a release position into a securing position to close the receiving gap (17) by means of the securing section (27, 127);

characterized in that
a second spring means (69) is provided via which the actuation section (19) is prestressed into the release position, with the switch body (57) being coupled to the actuation section (19) via the second spring means (69), and with the two spring means (61, 69) being matched to one another such that, on the movement of the actuation section (19) into the securing position and on the presence of a brake disk in the receiving gap (17), the pressure switch (55) is actuated against the spring force of the first spring means (61) and a remaining relative movement between the brake disk recognition device (47) and the actuation section (19) is compensated by the second spring means (69).

2. A brake disk lock in accordance with claim 1, characterized in that, in the securing position and on the presence of a brake disk in the receiving gap (17), the spring force exerted by the first spring means (61) is smaller than the spring force exerted by the second spring means (69).

3. A brake disk lock in accordance with claim 1, characterized in that the first spring means (61) and the second spring means (69) act in substantially the same direction.

4. A brake disk lock in accordance claim 1, characterized in that the spring constant of the first spring means (61) is smaller than the spring constant of the second spring means (69).

5. A brake disk lock in accordance with claim 1, characterized in that the actuation section (19) is made as a housing shell.

6. A brake disk lock in accordance with claim 5, characterized in that the housing shell (19) is made as a handle within which, in the release position and/or securing position, the pressure switch (55), the brake disk recognition device (47) and/or a housing (51) of the alarm device (49), in particular for at least one battery (53), is at least partly received.

7. A brake disk lock in accordance with claim 1, characterized in that the actuation section (19) and the pressure switch (55) are arranged pivotably with respect to one another.

8. A brake disk lock in accordance with claim 1, characterized in that the pressure switch (55) is rigidly attached to a housing (51) of the alarm device (49), in particular for at least one battery (53).

9. A brake disk lock in accordance with claim 8, characterized in that the actuation section (19) and the housing (51) of the alarm device (49) are arranged pivotably with respect to one another.

10. A brake disk lock in accordance with claim 1, characterized in that a lock body (11) is provided which has a support section (13) and an engagement hoop (15) which bound the receiving gap (17), with the actuation section (19) being supported movably, in particular pivotably, with respect to the support section (13) and/or with respect to the engagement hoop (15).

11. A brake disk lock in accordance with claim 10, characterized in that a third spring means (71) is provided via which the switch body (57) is coupled to the lock body (11).

12. A brake disk lock in accordance with claim 11, characterized in that the switch body (57) is coupled to the support section (13) or to the engagement hoop (15) via the third spring means (71).

13. A brake disk lock in accordance with claim 11, characterized in that the actuation section (19) is prestressed into the release position via the second spring means (69) and the third spring means (71).

14. A brake disk lock in accordance with claim 11, characterized in that the second spring means (69) and the third spring means (71) are substantially identical; they at least have identical spring constants.

15. A brake disk lock in accordance with claim 10, characterized in that the support section (13) corresponds to the brake disk recognition device (47).

16. A brake disk lock in accordance with claim 1, characterized in that an abutment (73) is provided for the brake disk recognition device (47) to bound the part of the relative movement between the brake disk recognition device (47) and the actuation section (19) taken up by the first spring means (61).

17. A brake disk lock in accordance with claim 1, characterized in that a latch (37) is provided, with the securing section (27, 127) being latched or latchable by means of the latch (37) in the securing position of the actuation section (19).

18. A brake disk lock in accordance with claim 1, characterized in that the brake disk recognition device (47) and the pressure switch (55) are arranged pivotably with respect to one another.

19. A brake disk lock in accordance with claim 18, characterized in that the actuation section (19), the brake disk recognition device (47) and the pressure switch (55) have a common pivot axis (21).

20. A brake disk lock in accordance with claim 1 characterized in that a locking mechanism (187) is provided, with the brake disk recognition device (47) being held in the position actuating the pressure switch (55) by means of the locking mechanism (187) in the securing position.

21. A brake disk lock in accordance with claim 1, characterized in that the contact element (59) is prestressed by means of the first spring means (61) with respect to the switch body (57) of the pressure switch (55).

22. A brake disk lock in accordance with claim 1, characterized in that the brake disk recognition device (47) is held in the release position of the actuation section (19) with clearance to the contact element (59) of the pressure switch (55).

23. A brake disk lock in accordance with claim 1, characterized in that the switch body (57) is urged out of the receiving gap (17) via the third spring means (71) in the release position of the actuation section (19).

24. A brake disk lock in accordance with claim 1, characterized in that the actuation section (19) and the brake disk recognition device (47) are coupled such that the brake disk recognition device (47) is moved along on the movement of the actuation section (19) into the securing position.

25. A brake disk lock in accordance with claim 1, characterized in that the brake disk recognition device (47) is substantially pivoted out of the receiving gap (17) in the release position of the actuation section (19).

* * * * *

UNITED STATES PATENT AND TRADEMARK OFFICE
CERTIFICATE OF CORRECTION

PATENT NO. : 8,085,137 B2  
APPLICATION NO. : 12/329059  
DATED : December 27, 2011  
INVENTOR(S) : Bernd Weiershausen Page 1 of 1

It is certified that error appears in the above-identified patent and that said Letters Patent is hereby corrected as shown below:

On the Cover Page  
(75) Inventor - delete "Rebe" and insert --Rehe--  
(30) Foreign Priority Data - delete "10 2007 058 550" and insert --10 2007 058 550.2--

In the Specification:  
Column 7, line 15 - delete "The" and insert --the--  
Column 7, line 24 - delete "is" and insert --it--  
Column 8, line 45 - delete "pressed" and insert --prestressed--  
Column 8, line 65 - delete "mans" and insert --means--

Signed and Sealed this  
First Day of May, 2012

David J. Kappos  
*Director of the United States Patent and Trademark Office*